United States Patent
Goupil, Jr. et al.

(10) Patent No.: US 6,623,350 B2
(45) Date of Patent: Sep. 23, 2003

(54) MOTOR VEHICLE AIR FILTER APPARATUS WITH AN EASILY REMOVABLE AIR FILTER

(75) Inventors: Gerald M. Goupil, Jr., N. Tonawanda, NY (US); Chad S. Pinger, Clarence Ctr, NY (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/078,118

(22) Filed: Feb. 19, 2002

(65) Prior Publication Data
US 2003/0157881 A1 Aug. 21, 2003

(51) Int. Cl.[7] ............................................... B60H 3/06
(52) U.S. Cl. ............................ 454/158; 55/481; 55/500
(58) Field of Search .................. 454/139, 158; 55/385.2, 385.3, 467.1, 478, 481, 500

(56) References Cited

U.S. PATENT DOCUMENTS

| | | | | |
|---|---|---|---|---|
| 3,470,680 A | * | 10/1969 | Avera | 55/497 |
| 4,653,200 A | * | 3/1987 | Werner | 34/82 |
| 4,925,468 A | | 5/1990 | Kishi et al. | 55/467 |
| 5,062,353 A | | 11/1991 | Arold et al. | |
| 5,230,727 A | * | 7/1993 | Pound et al. | 55/492 |
| 5,429,649 A | * | 7/1995 | Robin | 96/405 |
| 5,494,497 A | | 2/1996 | Lee | 55/480 |
| 5,613,991 A | | 3/1997 | Esaki et al. | 55/385.3 |
| 5,833,528 A | | 11/1998 | Baum et al. | 454/151 |
| 6,019,676 A | | 2/2000 | Kim | 454/155 |
| 6,280,316 B1 | | 8/2001 | Loup | 454/158 |
| 6,293,860 B1 | | 9/2001 | Kim | 454/155 |
| 6,425,819 B2 | * | 7/2002 | Maruyama et al. | 454/139 |

FOREIGN PATENT DOCUMENTS

| | | | |
|---|---|---|---|
| DE | 44 19 626 | * | 1/1995 |
| EP | 0 380 453 | * | 8/1990 |
| JP | 2000-247142 | * | 9/2000 |

* cited by examiner

*Primary Examiner*—Harold Joyce
(74) *Attorney, Agent, or Firm*—Patrick M. Griffin (57) ABSTRACT

An air filter apparatus filters air drawn into a vehicle. The air filter apparatus is disposed in an instrument panel in a passenger compartment of the vehicle. The air filter apparatus includes an air filter housing and a filter element disposed in the housing for filtering the air that is drawn into the vehicle. The housing includes an external air side and an internal air side. A filter channel of the housing is defined between the external and internal air sides. The filter element is disposed in the filter channel. The housing further includes a filter access port defined between the external and internal air sides and that extends from the filter channel. The filter access port terminates adjacent an outer skin of the instrument panel such that the filter element can be selectively removed from the filter channel for service and/or replacement of the filter element from the passenger compartment.

68 Claims, 5 Drawing Sheets

MOTOR VEHICLE AIR FILTER APPARATUS WITH AN EASILY REMOVABLE AIR FILTER

TECHNICAL FIELD

The subject invention generally relates to an air filter apparatus for filtering air that is drawn into a motor vehicle having a passenger compartment and an instrument panel disposed in the passenger compartment. More specifically, the subject invention relates to an air filter apparatus that includes a housing having an access port that terminates adjacent an outer skin of the instrument panel such that a filter element disposed in the housing can be selectively removed from the passenger compartment for service and/or replacement.

BACKGROUND OF THE INVENTION

Air filter apparatuses are components of heating, ventilating, and air conditioning (HVAC) systems and are known in the motor vehicle art. Air filter apparatuses include an air filter housing and a filter element disposed in the filter housing. Air filter apparatuses, including the filter element, are utilized in a motor vehicle to filter air that is drawn into a passenger compartment of the vehicle for purposes of heating, ventilating, and air conditioning the vehicle. The air frequently needs to be filtered to remove particulate matter, odors from outside the vehicle, and the like. The filter element frequently becomes clogged which impacts the performance of the HVAC system. Consequently, the filter element must be removed from the filter housing for service and/or replacement of the filter element.

The filter housing and the filter element disposed in the filter housing are conventionally disposed within an instrument panel of the vehicle. However, the filter housings and filter elements of the prior art are not conveniently located in the instrument panel. As a result, individuals such as owners and operators of the vehicle typically are not aware of the location, or even the existence, of the filter element in the instrument panel, and the filter element is not serviced or replaced as needed. Furthermore, other filter elements, such as the filter element disclosed in U.S. Pat. No. 6,280,316 can only be accessed from the engine compartment of the vehicle for service or replacement. Consequently, the individual is frequently forced to hire a mechanic just to access the filter element.

Figure 1:
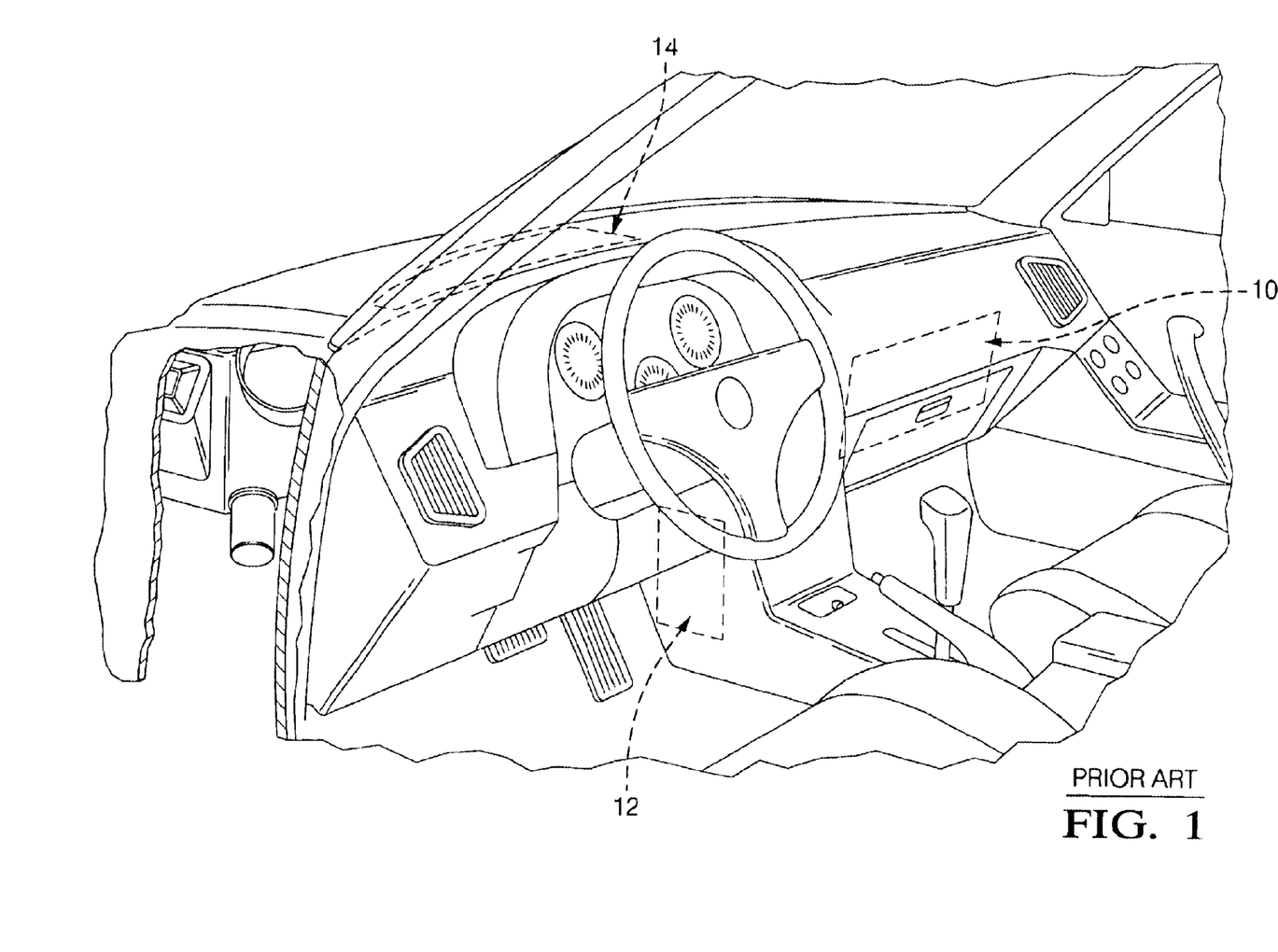
FIG. 1 is a perspective view of a vehicle illustrating three distinct access locations of prior art air filter apparatuses in the vehicle.

Even if the location of the filter element is known, the filter housings and filter elements of the prior art require disassembly of intricate mechanical components to access and remove the filter element. Referring now to FIG. 1, the filter housing and filter elements of the prior art that require disassembly of intricate mechanical components are more specifically disposed at three distinct locations within the instrument panel.

In a first example, indicated generally at 10, the filter element can only be accessed through a glove box. As such, in this first example, the glove box must first be removed to appropriately access and remove the filter element for service or replacement. As understood by those skilled in the art, the removal, and subsequent reinstallation, of the glove box may not be an easy task, especially for those who are not mechanically inclined.

In a second example, indicated generally at 12, the filter element can only be accessed through a filter access door located near an accelerator pedal of the vehicle. As such, in this second example, an individual must first lay on their back to remove the filter access door. After the door is removed, several components must be removed to appropriately service the filter element. As understood by those skilled in the art, it is not ideal to have the filter element in this location because the individual must orient themselves in an extremely awkward and uncomfortable position while accessing the filter element. Furthermore, the accelerator pedal and/or brake pedal can obstruct the process of removing this door.

Finally, in a third example, indicated generally at 14, the filter element can only be accessed through a leaf screen, i.e., or plenum, of the vehicle. As such, the filter element can only be accessed from outside, and not from the passenger compartment, of the vehicle. Also, as understood by those skilled in the art, the leaf screen is retained in place by plastic push pins or other similar fasteners. These plastic push pins must first be pried out or otherwise removed, and then the leaf screen must be removed before the filter element can be accessed and removed for service or replacement. Furthermore, reinstallation of the leaf screen with the plastic push pins may not be an easy task, especially for those who are not mechanically inclined.

Due to the deficiencies in the filter housings and filter elements of the prior art, including those identified above, it is desirable to provide an air filter apparatus that is conveniently located in an instrument panel of a motor vehicle such that individuals are aware of the location of the air filter apparatus and can readily service and/or replace a filter element from a passenger compartment of the vehicle in a simple and efficient manner without disassembly of any intricate components. More specifically, it is desirable to provide an air filter apparatus that includes a filter access port that terminates adjacent the outer skin of the instrument panel to facilitate the easy service and/or replacement of the filter element from the passenger compartment.

SUMMARY OF THE INVENTION

An air filter apparatus for a motor vehicle is disclosed. The vehicle includes a passenger compartment and an instrument panel having an outer skin. The air filter apparatus is disposed in the instrument panel and filters air that is drawn into the vehicle. The air filter apparatus comprises an air filter housing and a filter element. The air filter housing includes an external air side, an internal air side, and a filter channel defined between the external and internal air sides. The filter element is disposed in the filter channel of the air filter housing for filtering the air that is drawn into the vehicle.

The air filter housing further comprises a filter access port that is defined between the external and internal air sides and that extends from the filter channel to terminate adjacent the outer skin of the instrument panel. As such, the filter element that is disposed in the filter channel can be selectively removed from the filter channel for service and/or replacement of the filter element from the passenger compartment of the vehicle.

Accordingly, the subject invention provides an air filter apparatus that is conveniently disposed in the instrument panel and that includes a filter access port that terminates adjacent an outer skin of the instrument panel such that the filter element can be readily serviced and/or replaced from the passenger compartment of the vehicle.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Referring to FIGS. 2 through 5, wherein like numerals indicate like or corresponding parts throughout the several views, a dashboard assembly, adapted for installation into a motor vehicle 16, is generally disclosed at 18. The vehicle 16 includes a front-of-dash wall 20 that defines an engine compartment 22 and a passenger compartment 24. The vehicle 16 also includes a windshield 26 disposed above the front-of-dash wall 20.

Figure 2:
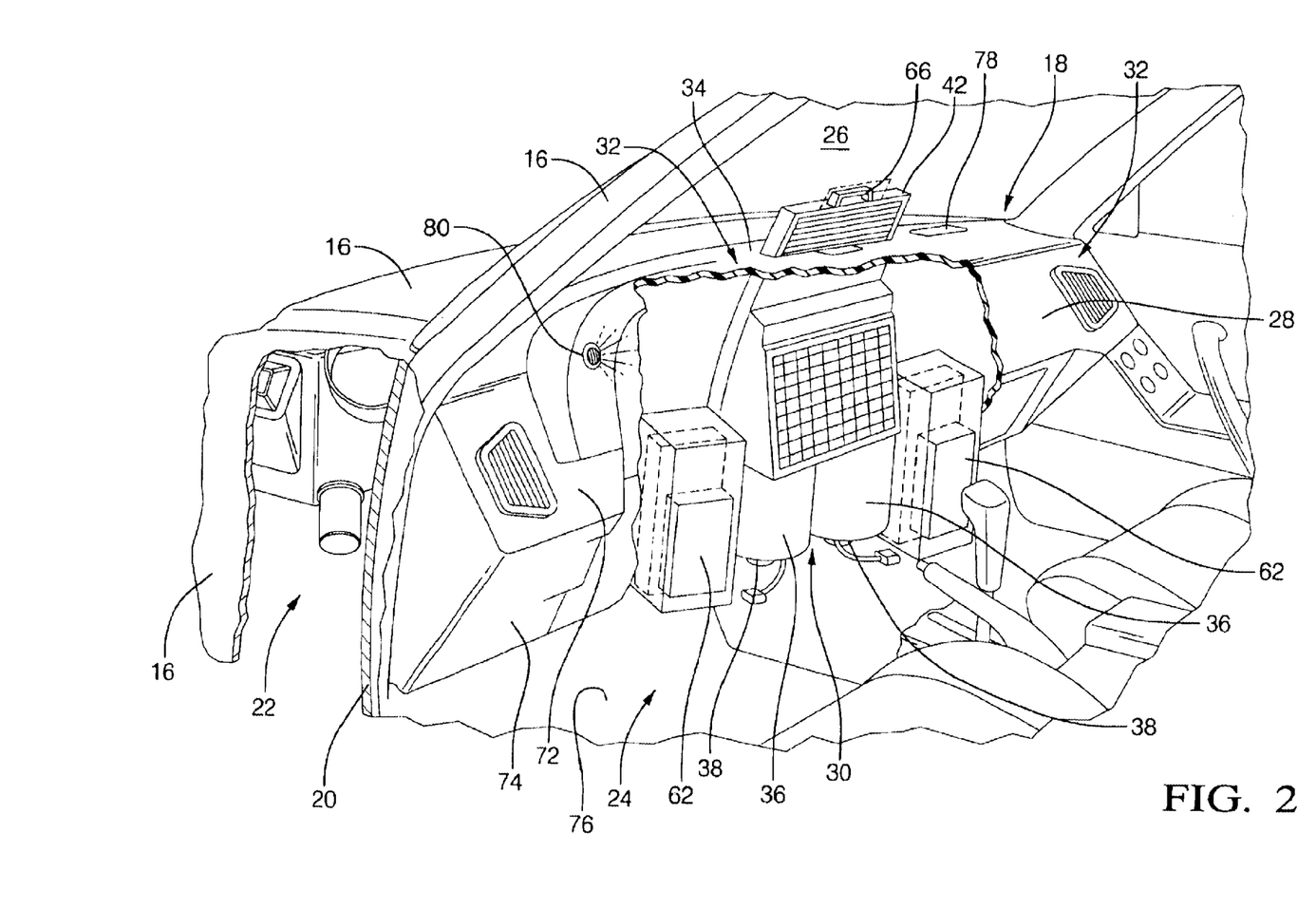
FIG. 2 is a partially cut-away perspective view of a vehicle illustrating an air filter apparatus according to the subject invention disposed in an instrument panel of the vehicle.

The dashboard assembly 18 includes an instrument panel 28 and an air filter apparatus 30. The air filter apparatus 30 will be described below. The dashboard assembly 18, as well as the instrument panel 28, is disposed in the passenger compartment 24 of the vehicle 16. The instrument panel 28 has an outer skin 32. In the preferred embodiment of the subject invention, the outer skin 32 is further defined as an upper, or top, skin 34 of the instrument panel 28 that is adjacent the windshield 26.

The air filter apparatus 30 is a component of a heating, ventilating, and air conditioning (HVAC) system. As is understood by those skilled in the art, other typical components of the HVAC system include a scroll housing 36, a motor and fan unit 38, an evaporator core, not numbered, for cooling air, a heater core, not numbered, for heating air, and valves, not numbered, for directing the flow of air. The motor and fan unit 38 is hereinafter referred to as the fan unit 38. It is to be understood that FIG. 2 merely illustrates an interface of the air filter apparatus 30 and one type of HVAC system. As is understood by those skilled in the art, HVAC systems are produced in a large number of configurations that reposition the typical components. Examples of certain HVAC systems include, but are not limited to, center-mounted HVAC systems, cross car-mounted HVAC systems, and under hood-mounted HVAC systems where the fan unit 38 is located in any number of planes of orientation.

Figure 3:
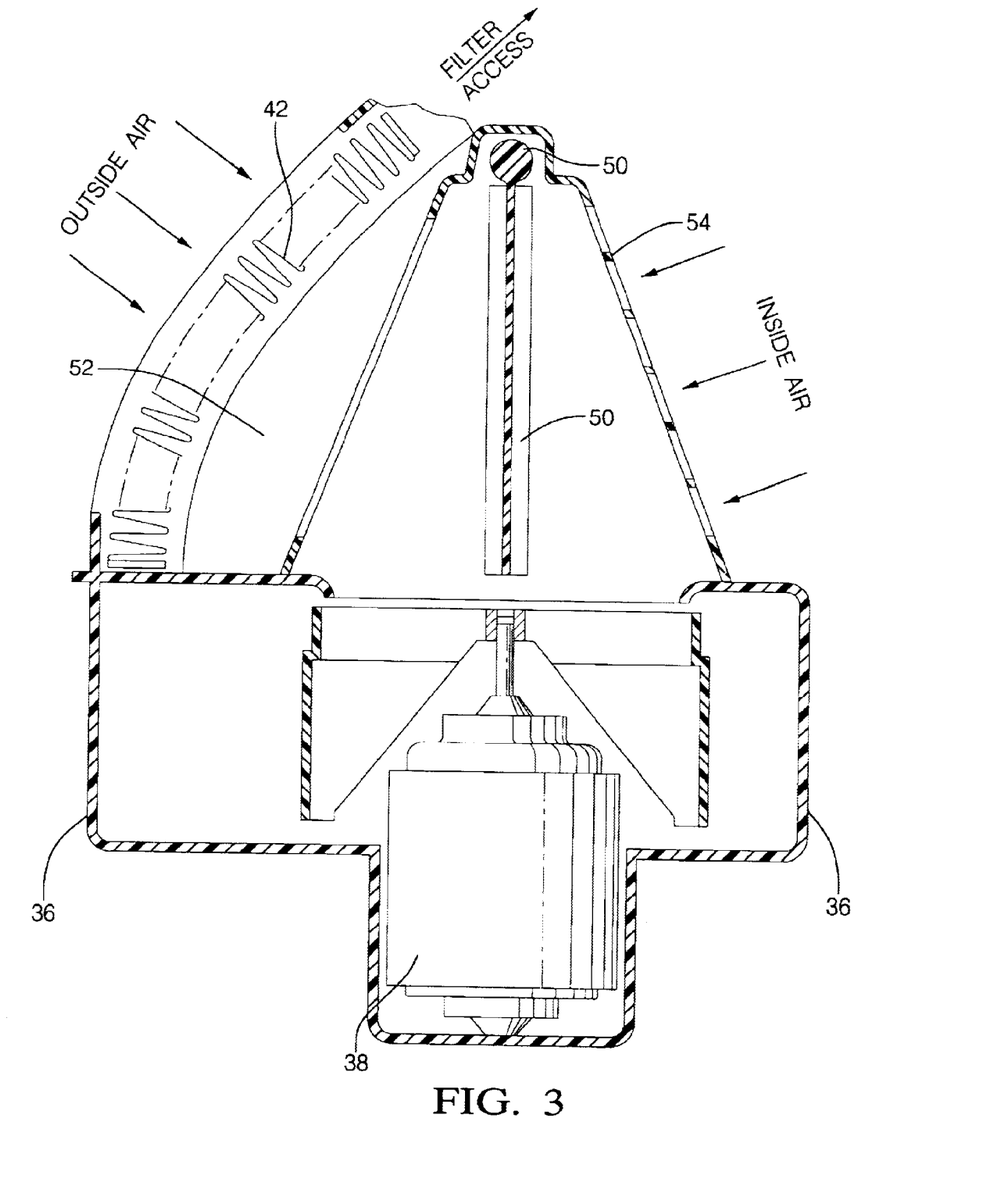
FIG. 3 is a partially cross-sectional side view of the air filter apparatus according to the subject invention.
Figure 4A:
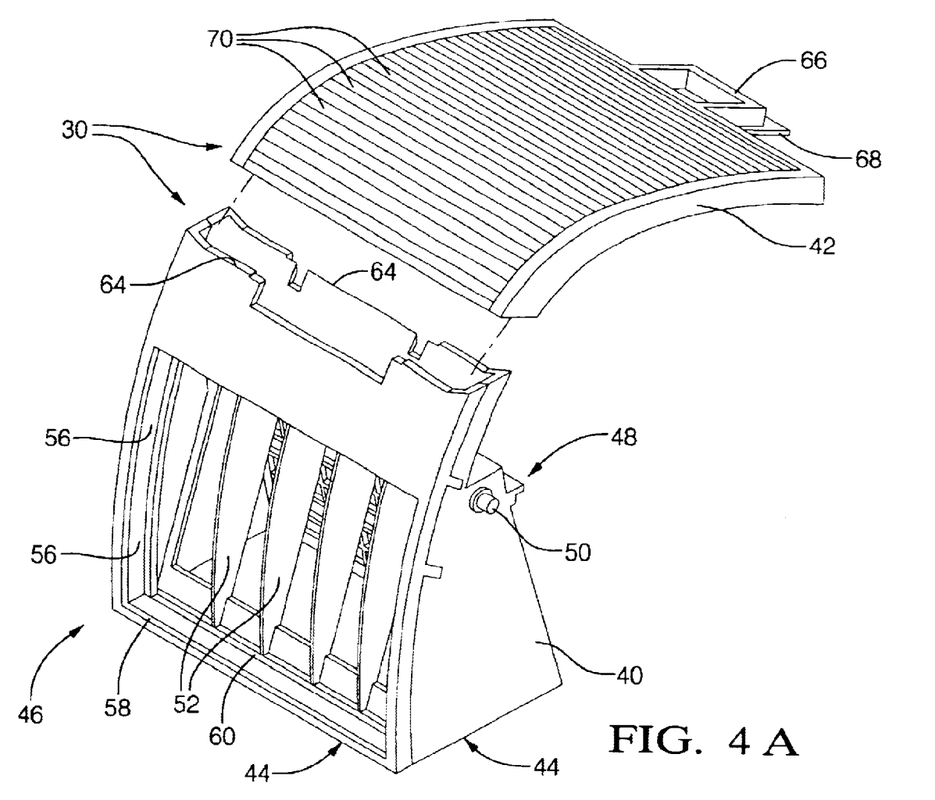
FIG. 4A is a perspective view of an air filter housing and a filter element of the air filter apparatus wherein the air filter housing includes a filter channel and the filter element is removed from the filter channel.
Figure 4B:
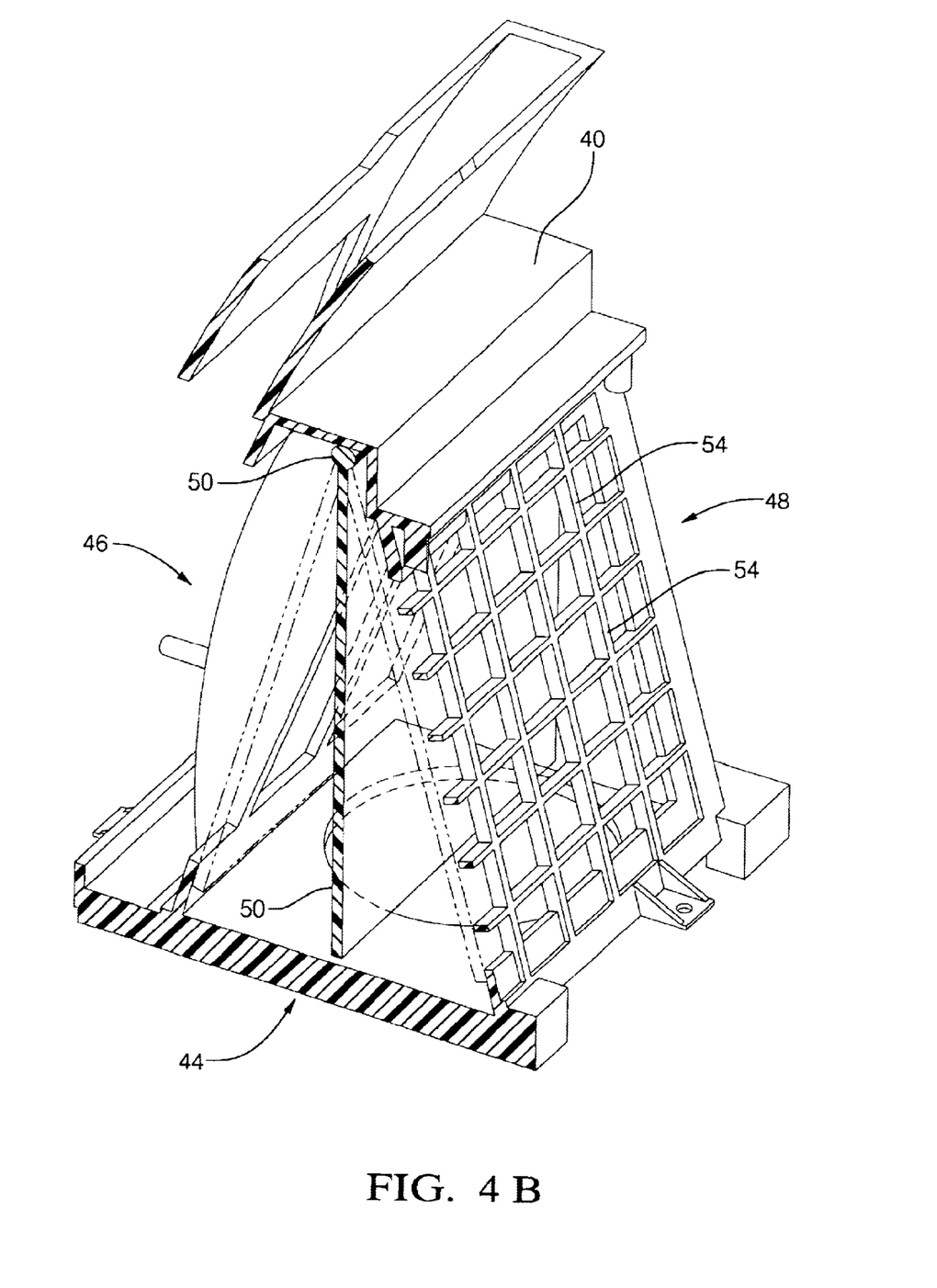
FIG. 4B is a perspective view of the air filter housing illustrating a grid and an air inlet valve.

As shown best in FIG. 3, the air filter apparatus 30 filters air that is drawn into the vehicle 16 and into the HVAC system for heating, ventilating, and air conditioning purposes. The air filter apparatus 30 includes an air filter housing 40 disposed in the instrument panel 28. The air filter apparatus 30 also includes a filter element 42 that is supported in the air filter housing 40. The filter element 42 is described below. The air filter apparatus 30 further includes the fan unit 38 that draws the air into the vehicle 16 and through the air filter housing 40. More specifically, the fan unit 38 impels the air into the vehicle 16 and through the air filter housing 40. Referring particularly to FIGS. 3, 4A, and 4B, the air filter housing 40 includes a base 44, an external air side 46, an internal air side 48, and an air inlet valve 50 disposed between the external and internal air sides 46, 48 for controlling the flow of air into and through the air filter housing 40.

As shown in FIG. 4B, the air inlet valve 50 is moveable between a first position and a second position, which are both represented in phantom. For the descriptive purposes of the subject invention, the terminology—between a first position and a second position—is also intended to encompass movement of the air inlet valve 50 between any and all intermediate positions between the first and second positions. In the first position, the external air side 46 is isolated from the fan unit 38 and the air is drawn through the air filter housing 40 from the internal air side 48. In this first position, the air is more specifically drawn through the air filter housing 40 from the passenger compartment 24 of the vehicle 16 and then through the internal air side 48. In the second position, the internal air side 48 is isolated from the fan unit 38 and the air is drawn into the vehicle 16 and through the air filter housing 40 from the external air side 46. In this second position, the air is more specifically drawn into the vehicle 16 from an environment external to the vehicle 16, through a plenum, not numbered, and then through the air filter housing 40 from the external air side 46. Note that in FIG. 4A, although a shaft portion of the air inlet valve 50 is disclosed protruding through a port in the air filter housing 40, the remainder of the air inlet valve 50 has been excluded for illustrative purposes.

The air filter housing 40 further comprises at least one retention rib 52 and a grid 54. The retention rib 52 is disposed between the filter element 42 and the fan unit 38. As a result, the retention rib 52 prevents the filter element 42 from being drawn or sucked into the fan unit 38 as the air is drawn into the vehicle 16 and through the air filter housing 40 by the fan unit 38. As disclosed best in FIG. 4A, the air filter housing 40 preferably includes a plurality of retention ribs 52 to prevent the entire filter element 42 from being drawn into the fan unit 38. The grid 54 is disposed between the internal air side 48 of the air filter housing 40 and the fan unit 38. As a result, the grid 54 prevents debris, especially debris from a glove box of the vehicle 16 such as miscellaneous paper and wrappers, from being drawn or sucked into the fan unit 38 as the air is drawn through the air filter housing 40 by the fan unit 38.

The air filter housing 40 further includes a filter channel 56 defined between the external and internal air sides 46, 48. More specifically, the air filter housing 40 includes a first frame portion 58 and a second frame portion 60 to define the filter channel 56. The first frame portion 58 is at the external air side 46 of the air filter housing 40, and the second frame portion 60 is spaced from the first frame portion 58 toward the internal air side 48 to define the filter channel 56 between the first and second frame portions 58, 60. As disclosed in FIG. 4A, the first and second frame portions 58, 60 outline an air passage, not numbered, where the air that is drawn into the vehicle 16 and into the air filter housing 40 flows through the filter element 42 at the external air side 46 when the filter element 42 is in the filter channel 56.

The air filter apparatus 30 includes the filter element 42 for filtering the air that is drawn into the vehicle 16 before the air ultimately flows into the passenger compartment 24. The filter element 42 is disposed in the filter channel 56 of the air filter housing 40 between the first and second frame portions 58, 60. The filter element 42 easily slides within the filter channel 56. After the air is impelled into the vehicle 16, the air flows through the air passage and the filter element 42, and then through the fan unit 38 and into the scroll housing 36 where the air is conditioned, i.e., either heated or cooled, and is subsequently distributed into the passenger compartment 24 through various outlet ducts 62 of the scroll housing 36. The outlet ducts 62 are represented schematically in FIG. 2.

Because, as described above in the Background of the Invention section, the filter element 42 frequently becomes clogged, an individual such as the owner or operator of the vehicle 16 must access and selectively remove the filter element 42 from the air filter housing 40 for service, such as washing, and/or complete replacement with a new filter element 42. To conveniently access and remove the filter element 42, the air filter housing 40 further comprises a filter access port 64. The filter access port 64 is defined between the external and internal air sides 46, 48 of the air filter housing 40. Furthermore, as disclosed in the Figures, the filter access port 64 extends from the filter channel 56 to terminate adjacent the outer skin 32 of the instrument panel 28. As such, the filter element 42 can be selectively removed from the filter channel 56 for service and/or replacement of the filter element 42 from the passenger compartment 24 of the vehicle 16. As disclosed best in FIG. 4A, the filter access port 64 is integral with, i.e., one-piece with, the filter channel 56 although this is not required.

The air filter apparatus 30 further comprises a handle 66 that extends from the filter element 42. The handle 66, extending from the filter element 42, facilitates the selective removal of the filter element 42 from the filter channel 56. Preferably, the handle 66 is rotatably connected (see the difference in the position of the handle 66 from FIG. 5A to FIG. 5B) to the filter element 42 to facilitate the selective removal of the filter element 42 from the filter channel 56. The rotatable connection between the handle 66 and the filter element 42 facilitates the selective removal of the filter element 42 from the filter channel 56 by enhancing ergonomics associated with the individual manipulating the handle 66.

Figure 5A:
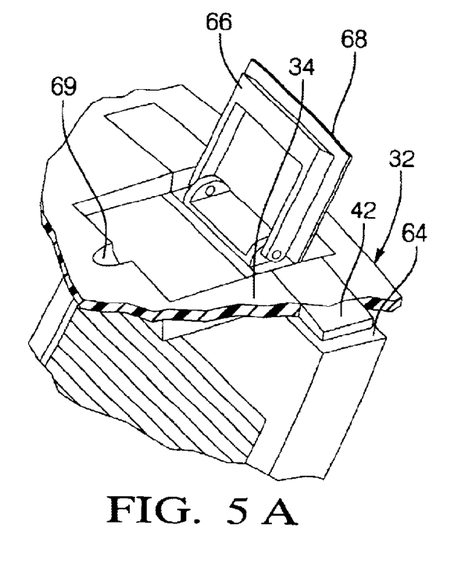
FIG. 5A is an enlarged perspective view of a handle in an open position where the handle extends from the filter element to facilitate the selective removal of the filter element from the filter channel.
Figure 5B:
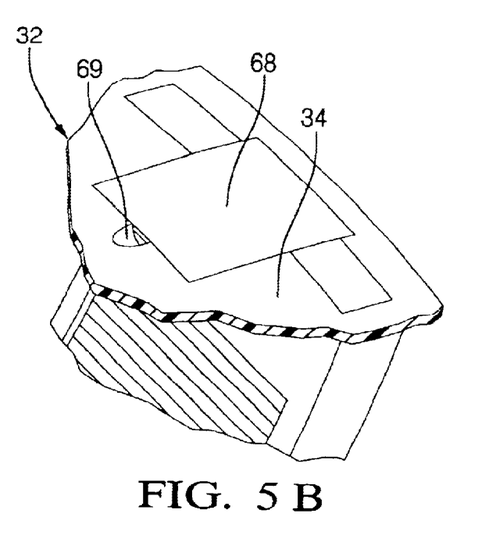
FIG. 5B is an enlarged perspective view of the handle of FIG. 4A in a closed position where the handle is at least partially disposed in a filter access port and a handle cover at least partially conceals the handle in an outer skin of the instrument panel.

The handle 66 rotates between a closed and an open position. In FIG. 5B, the closed position, the handle 66 is flush with the outer skin 32 of the instrument panel 28. Furthermore, when the handle 66 is rotated into the closed position, it is at least partially disposed in the filter access port 64. As such, the handle 66 is essentially concealed from view. To further conceal the handle 66 from view, the air filter apparatus 30 further includes a handle cover 68 extending from the handle 66. The handle cover 68 at least partially conceals the handle 66 in the outer skin 32 of the instrument panel 28 when the handle 66 is in the closed position. Preferably, the handle cover 68 is formed of the same material as the outer skin 32 of the instrument panel 28. On the other hand, in FIG. 5A, the open position, the handle 66 extends outwardly beyond the outer skin 32 of the instrument panel 28. Because the handle 66 extends outwardly beyond the outer skin 32 of the instrument panel 28, the handle 66 is readily accessible to the individual thereby facilitating the selective removal of the filter element 42 from the filter channel 56.

To remove the filter element 42 from the filter channel 56, the individual flips the handle cover 68 from the closed position away from the outer skin 32 of the instrument panel 28 into the open position. To assist the individual in flipping the handle cover 68, a finger channel 69 may be included. With the handle cover 68 flipped and the handle 66 in the open position, the individual simply grabs the handle 66, which extends from the filter element 42, and pulls the filter element 42 out of the filter channel 56. The individual actually pulls the filter element through the outer skin 32 of the instrument panel 28. In the preferred embodiment, the individual pulls the filter element 42 upward and into the passenger compartment 24 of the vehicle 16.

In this preferred embodiment, it is necessary to avoid obstruction from the windshield 26 of the vehicle 16 as the individual is pulling the filter element 42 upward. Accordingly, as disclosed best in FIGS. 3, 4A, and 4B, the filter channel 56 is convex between the base 44 of the air filter housing 40 and the filter access port 64. That is, the filter channel 56 is curved or contoured between the base 44 and the filter access port 64 to follow or track an angle of the windshield 26. Furthermore, the filter element 42 includes at least one filter pleat 70. Preferably, the filter element 42 includes a plurality of filter pleats 70. The filter pleat or pleats 70 permit the filter element 42 to flex within the convex filter channel 56 as the filter element 42 is selectively removed from the filter channel 56. As such, the windshield 26 can be avoided as the individual pulls the filter element 42 into the passenger compartment 24.

In the preferred embodiment of the subject invention, where, as disclosed in FIG. 2, the outer skin 32 of the instrument panel 28 is the upper skin 34, the filter access port 64 is actually flush with the upper skin 34. However, in alternative embodiments of the subject invention, if the outer skin 32 of the instrument panel 28 is a vertical skin 72 of the instrument panel 28, the filter access port 64 would then be flush with this vertical skin 72, and the filter channel 56 and the filter access port 64 would extend essentially horizontally within the instrument panel 28. Therefore, to selectively remove the filter element 42, the individual would simply pull the filter element 42 horizontally toward his or herself and into the passenger compartment 24. In a further alternative embodiment, if the outer skin 32 of the instrument panel 28 is a lower skin 74 of the instrument panel 28, the filter access port 64 would then be flush with this lower skin 74 and, to selectively remove the filter element 42, the individual would simply pull the filter element 42 downwardly toward a floorboard 76 of the vehicle 16 and into the passenger compartment 24.

To inform the individual of the presence of the filter element 42 and also to enhance awareness of the location of the filter element 42, the subject invention further includes indicia 78, such as a printed label, disposed on the outer skin 32 of the instrument panel 28. Of course, it is to be understood that the indicia 78 is not limited to a printed label. As a non-limiting example, the indicia 78 could read "AIR FILTER ACCESS PORT." The indicia 78 would, therefore, notify the individual about the filter access port 64 such that the individual can readily locate the filter element 42 for the selective removal.

In the preferred embodiment, an alarm 80 is included to alert the individual that the filter element 42 should be serviced and/or replaced. The function of the alarm 80 is not critical to the scope of the subject invention. However, the alarm 80 may function depending on air flow, pressure differential, and the like. The alarm 80 may be audible, such as a ping or computerized voice, or the alarm may be visual, such as a warning light or a message displayed on an information screen. In the most preferred embodiment, the alarm 80 is visually displayed on the instrument panel 28 such that the individual is immediately aware the service and/or replacement is required.

It is to be understood that the indicia 78 and the alarm 80 are represented schematically in FIG. 2.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A dashboard assembly adapted for installation into a motor vehicle, said dashboard assembly comprising:

an instrument panel having an outer skin wherein said instrument panel is adapted to be disposed in a passenger compartment of the vehicle;

an air filter housing comprising a base, an external air side, an internal air side, and a filter channel defined between said external and internal air sides, said air filter housing being disposed in said instrument panel for filtering air drawn into the vehicle;

a filter element disposed in said filter channel of said air filter housing for filtering the air drawn into the vehicle; and said air filter housing further comprising a filter access port defined between said external and internal air sides and extending from said filter channel to terminate adjacent said outer skin of said instrument panel;

wherein said filter channel is convex between said base and said filter access port such that said filter element can be selectively removed from said filter channel for service and/or replacement of said filter element from the passenger compartment of the vehicle without obstruction.

2. A dashboard assembly as set forth in claim 1 wherein said outer skin is further defined as an upper skin of said instrument panel adjacent a windshield of the vehicle.

3. A dashboard assembly as set forth in claim 2 wherein said filter access port is flush with said upper skin of said instrument panel.

4. A dashboard assembly as set forth in claim 1 further comprising a handle extending from said filter element to facilitate said selective removal of said filter element from said filter channel.

5. A dashboard assembly as set forth in claim 4 wherein said handle is rotatably connected to said filter element to facilitate said selective removal of said filter element from said filter channel.

6. A dashboard assembly as set forth in claim 5 wherein said handle rotates between a closed position where said handle is flush with said outer skin of said instrument panel and an open position where said handle extends outwardly beyond said outer skin of said instrument panel to facilitate said selective removal of said filter element from said filter channel.

7. A dashboard assembly as set forth in claim 6 wherein said handle is at least partially disposed in said filter access port when said handle is in said closed position.

8. A dashboard assembly as set forth in claim 4 further comprising a handle cover extending from said handle to at least partially conceal said handle in said outer skin of said instrument panel when said handle is in said closed position.

9. A dashboard assembly as set forth in claim 1 further comprising a fan unit that draws the air into the vehicle and through said air filter housing.

10. A dashboard assembly as set forth in claim 9 further comprising an air inlet valve disposed in said air filter housing between said external air side and said internal air side, wherein said air inlet valve is moveable between a first position where said external air side is isolated from said fan unit and the air is drawn through said air filter housing from said internal air side, and a second position where said internal air side is isolated from said fan unit and the air is drawn into the vehicle and through said air filter housing from said external air side.

11. A dashboard assembly as set forth in claim 9 wherein said air filter housing further comprises at least one retention rib disposed between said filter element and said fan unit to prevent said filter element from being drawn into said fan unit as the air is drawn into the vehicle and through said air filter housing by said fan unit.

12. A dashboard assembly as set forth in claim 9 wherein said air filter housing further comprises a grid disposed between said internal air side and said fan unit to prevent debris from being drawn into said fan unit as the air is drawn into the vehicle and through said air filter housing by said fan unit.

13. A dashboard assembly as set forth in claim 1 wherein said filter element comprises at least one filter pleat that permits said filter element to flex within said convex filter channel as said filter element is selectively removed from said filter channel.

14. A dashboard assembly as set forth in claim 1 further comprising indicia disposed on said outer skin of said instrument panel to notify an individual about said filter access port such that the individual can readily locate said filter element for said selective removal.

15. A dashboard assembly as set forth in claim 1 in combination with an alarm for alerting an individual that said filter element should be serviced and/or replaced.

16. A dashboard assembly as set forth in claim 15 wherein said alarm is visually displayed on said instrument panel.

17. A dashboard assembly as set forth in claim 1 wherein said air filter housing further comprises a first frame portion at said external air side of said air filter housing and a second frame portion spaced from said first frame portion to define said filter channel between said first and second frame portions.

18. A dashboard assembly as set forth in claim 17 wherein said first and second frame portions outline an air passage where the air that is drawn into the vehicle flows through said filter element disposed in said filter channel.

19. An air filter apparatus that is adapted to filter air drawn into a motor vehicle, wherein the vehicle includes a passenger compartment and an instrument panel having an outer skin, said air filter apparatus comprising:

an air filter housing comprising a base, an external air side, an internal air side, and a filter channel defined between said external and internal air sides;

a filter element disposed in said filter channel of said air filter housing for filtering the air drawn into the vehicle; and said air filter housing further comprising a filter access port defined between said external and internal air sides and extending from said filter channel wherein said filter access port is adapted to terminate adjacent the outer skin of the instrument panel;

wherein said filter channel is convex between said base and said filter access port such that said filter element can be selectively removed from said filter channel for service and/or replacement of said filter element from the passenger compartment without obstruction.

20. An air filter apparatus as set forth in claim 19 further comprising a handle extending from said filter element to facilitate said selective removal of said filter element from said filter channel.

21. An air filter apparatus as set forth in claim 20 wherein said handle is rotatably connected to said filter element to facilitate said selective removal of said filter element from said filter channel.

22. An air filter apparatus as set forth in claim 21 wherein said handle is at least partially disposed in said filter access port when said handle is rotated into a closed position.

23. An air filter apparatus as set forth in claim 20 further comprising a handle cover extending from said handle wherein said handle cover is adapted to at least partially conceal said handle in the outer skin of the instrument panel when said handle is rotated into a closed position.

24. An air filter apparatus as set forth in claim 19 further comprising a fan unit that is adapted to draw the air into the vehicle and through said air filter housing.

25. An air filter apparatus as set forth in claim 24 further comprising an air inlet valve disposed in said air filter housing between said external air side and said internal air side, wherein said air inlet valve is moveable between a first position where said external air side is isolated from said fan unit and the air is drawn through said air filter housing from said internal air side, and a second position where said internal air side is isolated from said fan unit and the air is drawn into the vehicle and through said air filter housing from said external air side.

26. An air filter apparatus as set forth in claim 24 wherein said air filter housing further comprises at least one retention rib disposed between said filter element and said fan unit to prevent said filter element from being drawn into said fan unit as the air is drawn into the vehicle and through said air filter housing by said fan unit.

27. An air filter apparatus as set forth in claim 24 wherein said air filter housing further comprises a grid disposed between said internal air side and said fan unit to prevent debris from being drawn into said fan unit as the air is drawn into the vehicle and through said air filter housing by said fan unit.

28. An air filter apparatus as set forth in claim 19 wherein said filter element comprises at least one filter pleat that permits said filter element to flex within said convex filter channel as said filter element is selectively removed from said filter channel.

29. An air filter apparatus as set forth in claim 19 in combination with an alarm for alerting an individual that said filter element should be serviced and/or replaced.

30. An air filter apparatus as set forth in claim 19 wherein said air filter housing further comprises a first frame portion at said external air side of said air filter housing and a second frame portion spaced from said first frame portion to define said filter channel between said first and second frame portions.

31. An air filter apparatus as set forth in claim 30 wherein said first and second frame portions outline an air passage where the air that is drawn into the vehicle flows through said filter element disposed in said filter channel.

32. A motor vehicle comprising:
a front-of-dash wall defining an engine compartment and a passenger compartment of said vehicle;
an instrument panel having an outer skin, said instrument panel being disposed in said passenger compartment of said vehicle;
an air filter housing comprising a base, an external air side, an internal air side, and a filter channel defined between said external and internal air sides, said air filter housing being disposed in said instrument panel for filtering air drawn into the vehicle;
a filter element disposed in said filter channel of said air filter housing for filtering the air drawn into the vehicle; and
said air filter housing further comprising a filter access port defined between said external and internal air sides and extending from said filter channel to terminate adjacent said outer skin of said instrument panel;
wherein said filter channel is convex between said base and said filter access port such that said filter element can be selectively removed from said filter channel for service and/or replacement of said filter element from said passenger compartment of said vehicle without obstruction.

33. A vehicle as set forth in claim 32 further comprising a windshield disposed above said front-of-dash wall and wherein said outer skin is further defined as an upper skin of said instrument panel adjacent said windshield.

34. A vehicle as set forth in claim 33 wherein said filter access port is flush with said upper skin of said instrument panel.

35. A vehicle as set forth in claim 32 further comprising a handle extending from said filter element to facilitate said selective removal of said filter element from said filter channel.

36. A vehicle as set forth in claim 35 wherein said handle rotates between a closed position where said handle is flush with said outer skin of said instrument panel and an open position where said handle extends outwardly beyond said outer skin of said instrument panel to facilitate said selective removal of said filter element from said filter channel.

37. A vehicle as set forth in claim 35 further comprising a handle cover extending from said handle to at least partially conceal said handle in said outer skin of said instrument panel when said handle is in said closed position.

38. A vehicle as set forth in claim 32 further comprising indicia disposed on said outer skin of said instrument panel to notify an individual about said filter access port such that the individual can readily locate said filter element for said selective removal.

39. A vehicle as set forth in claim 32 further comprising an alarm for alerting an individual that said filter element should be serviced and/or replaced.

40. A vehicle as set forth in claim 32 wherein said filter element comprises at least one filter pleat that permits said filter element to flex within said convex filter channel as said filter element is selectively removed from said filter channel.

41. A dashboard assembly adapted for installation into a motor vehicle, said dashboard assembly comprising:
an instrument panel having an outer skin wherein said instrument panel is adapted to be disposed in a passenger compartment of the vehicle;
an air filter housing comprising an external air side, an internal air side, and a filter channel defined between said external and internal air sides, said air filter housing being disposed in said instrument panel for filtering air drawn into the vehicle;
a filter element disposed in said filter channel of said air filter housing for filtering the air drawn into the vehicle;

said air filter housing further comprising a filter access port defined between said external and internal air sides and extending from said filter channel to terminate adjacent said outer skin of said instrument panel such that said filter element can be selectively removed from said filter channel for service and/or replacement of said filter element from the passenger compartment of the vehicle; and a handle extending from and rotatably connected to said filter element to facilitate said selective removal of said filter element from said filter channel.

42. A dashboard assembly as set forth in claim 41 wherein said outer skin is further defined as an upper skin of said instrument panel adjacent a windshield of the vehicle.

43. A dashboard assembly as set forth in claim 42 wherein said filter access port is flush with said upper skin of said instrument panel.

44. A dashboard assembly as set forth in claim 41 wherein said handle rotates between a closed position where said handle is flush with said outer skin of said instrument panel and an open position where said handle extends outwardly beyond said outer skin of said instrument panel to facilitate said selective removal of said filter element from said filter channel.

45. A dashboard assembly as set forth in claim 44 wherein said handle is at least partially disposed in said filter access port when said handle is in said closed position.

46. A dashboard assembly as set forth in claim 44 further comprising a handle cover extending from said handle to at least partially conceal said handle in said outer skin of said instrument panel when said handle is in said closed position.

47. A dashboard assembly as set forth in claim 41 wherein said air filter housing further comprises a base and said filter channel is convex between said base and said filter access port such that said filter element can be selectively removed from said filter channel without obstruction.

48. A dashboard assembly as set forth in claim 47 wherein said filter element comprises at least one filter pleat that permits said filter element to flex within said convex filter channel as said filter element is selectively removed from, said filter channel.

49. A dashboard assembly as set forth in claim 41 further comprising indicia disposed on said outer skin of said instrument panel to notify an individual about said filter access port such that the individual can readily locate said filter element for said selective removal.

50. A dashboard assembly as set forth in claim 41 in combination with an alarm for alerting an individual that said filter element should be serviced and/or replaced.

51. An air filter apparatus that is adapted to filter air drawn into a motor vehicle, wherein the vehicle includes a passenger compartment and an instrument panel having an outer skin, said air filter apparatus comprising:

an air filter housing comprising an external air side, an internal air side, and a filter channel defined between said external and internal air sides;

a filter element disposed in said filter channel of said air filter housing for filtering the air drawn into the vehicle;

said air filter housing further comprising a filter access port defined between said external and internal air sides and extending from said filter channel wherein said filter access port is adapted to terminate adjacent the outer skin of the instrument panel such that said filter element can be selectively removed from said filter channel for service and/or replacement of said filter element from the passenger compartment of the vehicle; and a handle extending from and rotatably connected to said filter element to facilitate said selective removal of said filter element from said filter channel.

52. An air filter apparatus as set forth in claim 51 wherein said handle is at least partially disposed in said filter access port when said handle is rotated into a closed position.

53. An air filter apparatus as set forth in claim 51 further comprising a handle cover extending from said handle wherein said handle cover is adapted to at least partially conceal said handle in the outer skin of the instrument panel when said handle is rotated into a closed position.

54. An air filter apparatus as set forth in claim 51 wherein said air filter housing further comprises a base and said filter channel is convex between said base and said filter access port such that said filter element can be selectively removed from said filter channel without obstruction.

55. An air filter apparatus as set forth in claim 54 wherein said filter element comprises at least one filter pleat that permits said filter element to flex within said convex filter channel as said filter element is selectively removed from said filter channel.

56. An air filter apparatus as set forth in claim 51 in combination with an alarm for alerting an individual that said filter element should be serviced and/or replaced.

57. A motor vehicle comprising:

a front-of-dash wall defining an engine compartment and a passenger compartment of said vehicle;

an instrument panel having an outer skin, said instrument panel being disposed in said passenger compartment of said vehicle;

an air filter housing comprising an external air side, an internal air side, and a filter channel defined between said external and internal air sides, said air filter housing being disposed in said instrument panel for filtering air drawn into the vehicle;

a filter element disposed in said filter channel of said air filter housing for filtering the air drawn into the vehicle;

said air filter housing further comprising a filter access port defined between said external and internal air sides and extending from said filter channel to terminate adjacent said outer skin of said instrument panel such that said filter element can be selectively removed from said filter channel for service and/or replacement of said filter element from said passenger compartment of said vehicle; and a handle extending from and rotatably connected to said filter element to facilitate said selective removal of said filter element from said filter channel.

58. A vehicle as set forth in claim 57 further comprising a windshield disposed above said front-of-dash wall and wherein said outer skin is further defined as an upper skin of said instrument panel adjacent said windshield.

59. A vehicle as set forth in claim 58 wherein said filter access port is flush with said upper skin of said instrument panel.

60. A vehicle as set forth in claim 57 wherein said handle rotates between a closed position where said handle is flush with said outer skin of said instrument panel and an open position where said handle extends outwardly beyond said outer skin of said instrument panel to facilitate said selective removal of said filter element from said filter channel.

61. A vehicle as set forth in claim 60 further comprising a handle cover extending from said handle to at least partially conceal said handle in said outer skin of said instrument panel when said handle is in said closed position.

62. A vehicle as set forth in claim 57 wherein said air filter housing further comprises a base and said filter channel is convex between said base and said filter access port such that said filter element can be selectively removed from said filter channel without obstruction.

63. A vehicle as set forth in claim 57 further comprising indicia disposed on said outer skin of said instrument panel to notify an individual about said filter access port such that the individual can readily locate said filter element for said selective removal.

64. A vehicle as set forth in claim 57 further comprising an alarm for alerting an individual that said filter element should be serviced and/or replaced.

65. An air filter apparatus that is adapted to filter air drawn into a motor vehicle, wherein the vehicle includes a passenger compartment and an instrument panel having an outer skin, said air filter apparatus comprising:

an air filter housing comprising an external air side, an internal air side, and a filter channel defined between said external and internal air sides;

a filter element disposed in said filter channel of said air filter housing for filtering the air drawn into the vehicle;

said air filter housing further comprising a filter access port defined between said external and internal air sides and extending from said filter channel wherein said filter access port is adapted to terminate adjacent the outer skin of the instrument panel such that said filter element can be selectively removed from said filter channel for service and/or replacement of said filter element from the passenger compartment of the vehicle;

a handle extending from said filter element to facilitate said selective removal of said filter element from said filter channel; and a handle cover extending from said handle wherein said handle cover is adapted to at least partially conceal said handle in the outer skin of the instrument panel when said handle is rotated into a closed position.

66. An air filter apparatus as set forth in claim 65 wherein said handle is rotatably connected to said filter element to facilitate said selective removal of said filter element from said filter channel.

67. A dashboard assembly adapted for installation into a motor vehicle, said dashboard assembly comprising:

an instrument panel having an upper skin adjacent a windshield of the vehicle, wherein said instrument panel is adapted to be disposed in a passenger compartment of the vehicle;

an air filter housing comprising a base, an external air side, an internal air side, and a filter channel defined between said external and internal air sides, said air filter housing being disposed in said instrument panel for filtering air drawn into the vehicle;

a filter element disposed in said filter channel of said air filter housing for filtering the air drawn into the vehicle; and said air filter housing further comprising a filter access port defined between said external and internal air sides and extending from said filter channel to terminate adjacent said upper skin of said instrument panel;

wherein said filter channel is convex between said base and said filter access port such that said filter element can be selectively removed from said filter channel for service and/or replacement of said filter element from the passenger compartment of the vehicle without obstruction from the windshield of the vehicle.

68. A dashboard assembly as set forth in claim 67 further comprising a handle extending from said filter element to facilitate said selective removal of said filter element from said filter channel.

* * * * *